United States Patent [19]

Lou et al.

[11] Patent Number: 5,476,675
[45] Date of Patent: Dec. 19, 1995

[54] EXTRUSION AND AGGLOMERATION PROCESS FOR FIBER CONTAINING FOOD INGREDIENT

[75] Inventors: Wen C. Lou, Morris Plains; Chee-Teck Tan, Middletown; Lewis G. Scharpf, Jr., Fair Haven; Joseph Panarisi, Ocean Township, all of N.J.

[73] Assignee: International Flavors & Fragrances Inc., New York, N.Y.

[21] Appl. No.: 346,216

[22] Filed: Nov. 22, 1994

Related U.S. Application Data

[63] Continuation-in-part of Ser. No. 123,381, Sep. 20, 1993, abandoned.

[51] Int. Cl.⁶ .................................................... A23L 2/00
[52] U.S. Cl. .................. 426/590; 426/516; 426/517; 426/518; 426/549; 426/591; 426/593
[58] Field of Search .................................... 426/516, 591, 426/593, 549, 517, 518, 590

[56] References Cited

U.S. PATENT DOCUMENTS

| | | | |
|---|---|---|---|
| 2,889,226 | 6/1959 | Hinkley et al. | 426/591 |
| 3,053,663 | 9/1962 | Donahue | 426/593 |
| 4,089,988 | 5/1978 | Mostyn et al. | 426/578 |
| 4,948,600 | 8/1990 | Zumbé et al. | 426/573 |
| 4,973,486 | 11/1990 | Matsumoto et al. | 426/593 |
| 5,264,228 | 11/1993 | Pray et al. | 426/593 |

*Primary Examiner*—Helen Pratt
*Attorney, Agent, or Firm*—Arthur L. Liberman; Robert G. Weilacher

[57] ABSTRACT

A process is disclosed for preparing a substantially dry edible flavor fiber product by admixing water, a powdered flavor, a binder and fiber together and extruding the resulting mixture. The process can be carried out by first admixing a powdered flavor material with a fiber to form a flavor-fiber and mixture, then the flavor-fiber mixture is introduced into an extruder where water is simultaneously introduced and the resulting composition, containing water, fiber and flavor is extruded to form a product. The flavor fiber product can be an instant beverage, such as chocolate.

2 Claims, 9 Drawing Sheets

EXTRUSION AND AGGLOMERATION PROCESS FOR FIBER CONTAINING FOOD INGREDIENT

REFERENCE TO A RELATION APPLICATION

This a continuation-in-part of our patent application Ser. No. 08/123,381, filed Sep. 20, 1993, now abandoned, which is relied on and incorporated herein by reference.

BACKGROUND OF THE INVENTION

The present invention relates to a method of preparing a granular flavor-fiber edible product. In a further aspect, the present invention relates to granular, substantially dry, free-flowing flavor-fiber edible products and food products containing the same. More particularly, the products produced in accordance with the present invention are ingredients for food items of a wide variety for the purpose of imparting flavor and also desirable aromas.

In recent years the importance of incorporating amounts of fiber in the diet has been emphasized by many authorities in the health field. Evidence related to the role of dietary factors in cancer and gastrointestinal diseases suggests that foods low or reduced in calories and fat and high in fiber are very desirable and should be made increasingly available by food manufacturers. At present, the average diet is relatively low in fiber. For example, the average American consumes 10 to 15 grams of fiber per day while the recommendation for fiber consumption is 35 to 40 grams per day. More than ten years ago, The National Academy of Sciences recommended that Americans should eat whole grain cereals, fruits and vegetables on a daily basis. Other organizations such as The American Institute of Cancer Research, The American Cancer Society and The National Cancer Institute suggest that Americans should consume more high fiber foods and to increase their daily intake up to at least 25 to 35 grams of fiber every day. As a result of the publication of various research studies and reports, it is now common for fiber to be added to such products as breakfast cereals, cookies, canned beans, snack bars, crackers, breads and rolls, tofu desserts, snacks, frozen entrees, dry mix rice dishes, yogurt and bakery dry mixes.

The reasons for the importance of fiber in the daily diet lie in the structure and nature of fibrous materials. In plants, the fiber constitutes the material of the cell walls. Accordingly, in the plant, the cell wall performs a mechanical and structural role and provides the backbone for the plant. Normally, the human alimentary enzymes do not digest the fiber which constitutes the remnants of plant cells. The fiber is largely a nonstarch polysaccharide and lignin. Total dietary fiber is spoken of today as including the amount of lignin and polysaccharides that are not digested by gastrointestinal enzymes of the human digestive system. It is therefore believed that total dietary fiber is formed of cellulose, hemicellulose, pectins, gums, lignin and mucilages. The carbohydrate that is most often found in nature is cellulose which is a polymer of glucose. The cell walls of virtually all plants found on land are formed of cellulose in their structural components. Cellulose occurring in nature is not soluble in water and is not digested in the human alimentary canal.

Another class of cellulose type materials are the hemicelluloses which are plant polysaccharides extractable by aqueous alkali. The hemicelluloses are polymers of pentose and hexose sugars and uronic acids. These materials create a system in which the cellulose fibers are found.

Another group of materials are the pectins which are a mixture of polysaccharides of galacturonic acid units with side chains containing arabinose, galactose, xylose and rhamnose. These materials are considered to be water soluble non structured polysaccharides. Gums and mucilages have no common structure but are polysaccharides containing several sugars with alternating monomer structures. Lignin is a further major component of plants and is formed of a polymer of aromatic plant alcohols. This woody substance gives plants their structure and support. As the lignin hardens it functions as a glue to hold the other plant cells in the wall together. This stiffening effect prevents biochemical degradation and physical destruction of the cells.

Thus the industry has been seeking ways to incorporate fiber into a variety of food products in order to increase the fiber content of the average American diet.

A report of the Surgeon General points out that frequent consumption of vegetables and fruits, particularly dark green and deep yellow vegetables and cruciferous vegetables such as cabbage and broccoli may lower the risk for cancers in the luna and bladder as well as some cancers in the alimentary track, recognizing however that the specific components in these foods that may have the protective effects have not been established. As explained in the report, dietary patterns emphasizing foods high in complex carbohydrates and fiber are associated with lower risks of diverticulosis and some types of cancer. The association shown in epidemiologic and animal studies between diets high in complex carbohydrates and reduced risks for coronary heart disease and diabetics mellitus is, however, difficult to interpret. The fact that such diets tend also to be lower in energy and fats, especially saturated fat and cholesterol, clearly contributes to this difficulty. Despite the uncertainty of the fibers exact role in preventing disease, it is certainly apparent that everyone should increase their daily intake of complex carbohydrates and fiber. Thus since the mid 1980's there has been an enormous increase in the types and sources of fiber that have been introduced into the American diet. For example, oat fibers and oat bran and corn bran have been suggested for introduction into white breads, hot and cold cereals, muffins, soft pretzels and other baked products. Cereals, pizza and pasta have also had dietary fiber such as corn bran introduced as a part of their composition in an effort to produce higher fiber intake in such products. Snack foods and the like have also had their bran content increased by incorporating oat fiber and corn bran.

These new fiber added products are meeting success in the market place. Ready to eat cereals, low fat snack foods, and specialized bread and cake products have had an increase in their market share since the late 1980's. Thus there has been an increased level of consumer awareness in the importance of having fiber in the diet as a way to improve health not only to control weight. Fiber is an important part of diet food formulations because the food with the high fiber content functions in ways that takes advantage of the fiber's capacity to absorb several times its weight in water causing it to gain volume in the stomach and making the person undertaking the diet have a full satisfied feeling.

With the food manufacturing industry embarking on the preparation of all types of food products having a higher fiber content, attention has also been directed to the beverage and instant hot and cold drink market with the thought to provide improved and more flavorful products which also have a higher fiber content than do conventional beverages.

The present invention is directed to the fabrication of a granular flavor-fiber edible product which has a wide range of applicability in many different food products, especially in the beverage market to produce hot and cold drinks. Of particular interest is the application of the present invention to produce instant type beverage formulations.

SUMMARY OF THE INVENTION

It is an object of the present invention to provide a process for preparing an edible, fiber containing flavor product in granular form by admixing water, a powdered or liquid flavor, a binder and fiber together and extruding the resulting mixture to produce a substantially dry, free-flowing granular product. More particularly, the process of the present invention can be carried out by first admixing a powdered or liquid flavor material with a fiber to form a flavor-fiber admixture. Then the flavor-fiber mixture is introduced into an extruder where a small amount of water is simultaneously introduced and the resulting composition, containing the controlled amount of water, fiber and flavor is extruded to form a product. Thereafter, the extruded product is milled. Because the resulting product from the milling is a substantially dry and free-flowing granulate, it can be readily dispersed in a liquid, such as hot water, to produce a pleasing drink. As an alternative, the present invention contemplates a process for preparing the final product by adding fiber to the extruder and adding a powder and flavor to the extruder and separately adding a controlled quantity of water to the extruder and then extruding the resulting fiber and water containing composition.

In a still further variation of the present invention a flavor-fiber product can be prepared by mixing a controlled amount of water with a powdered or liquid flavor, adding the resulting mixture to an extruder, adding fiber to the extruder and then extruding the resulting admixture of flavor, fiber and water. The amount of water used in the process of the invention is carefully controlled to produce a substantially dry product.

To facilitate the eventual introduction of the flavor fiber product into a food such as a beverage, it is desirable to first form the extrudate and then pelletize the extrudate, cooling the pelletized product and then milling the product so formed to produce a free-flowing granule that is dry to the touch and is readily dispersible in liquids.

BRIEF DESCRIPTION OF THE DRAWINGS

The present invention will be further understood with reference to the accompanying drawings wherein.

DETAILED DESCRIPTION OF THE INVENTION

Figure 1:
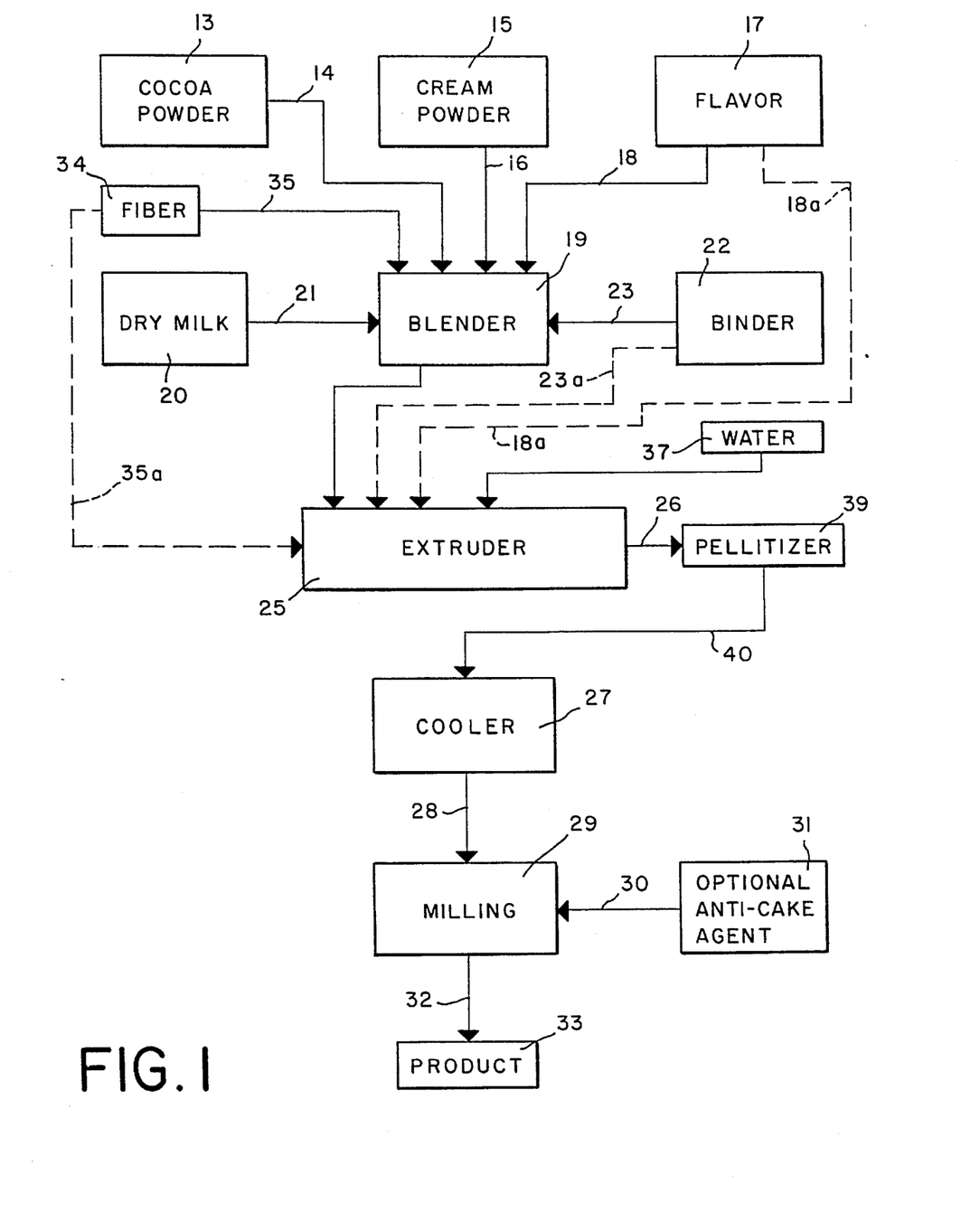
FIG. 1 is a schematic flow diagram showing the arrangement of process stations in accordance with one embodiment of the present invention whereby a flavor-fiber product is produced.

According to the invention described herein and as illustrated in FIG. 1, there is provided a process comprising several operations including alternative embodiments whereby a novel flavor fiber edible product can be produced. In carrying out the invention with respect to producing an instant chocolate flavored fiber containing food component, there can be introduced into a blender of conventional type 19, the various ingredients such as coca powder 13, cream powder 15 and flavor 17 for complete blending to form a blended mixture. Line 14 conveys the cocoa powder directly to the blender 19. Lines 16 and 18 convey the cream powder and flavor, respectively, to the blender. Fiber can be introduced from fiber source 34 through line 35 to blender 19. Dry milk source 20 is introduced through line 21 into blender 19. A suitable binder 22 is introduced via line 23 into the blender 19. After blending, the blended ingredients are then conveyed through line 24 to an extruder 25 of conventional design to produce a substantially dry product.

Alternatively, the flavor component 17 can be introduced directly into the extruder through line 18a and fiber source 34 can be directly introduced by a line 35a into extruder 25.

The binder source can also be introduced directly into extruder 25 through conduit 23a. Water source 37 is directly introduced through line 38 into the extruder is just sufficient amount to insure that the final product will be substantially dry.

The outflow from the extruder 25; namely, the extrudate can flow through line 26 to pelletizer 39 (or pelletizer 39 can be attached directly to extruder 25) and then through line 40 to cooler 27. Exiting the cooler through line 28 to the milling apparatus 29, the product eventually passes by way of line 32 to product collection station 33 for convenient packaging. Optionally, a source of anti-caking material which can be any conventional anti-caking agent 31 can be introduced into the milling site 29 through line 30.

Figure 2:
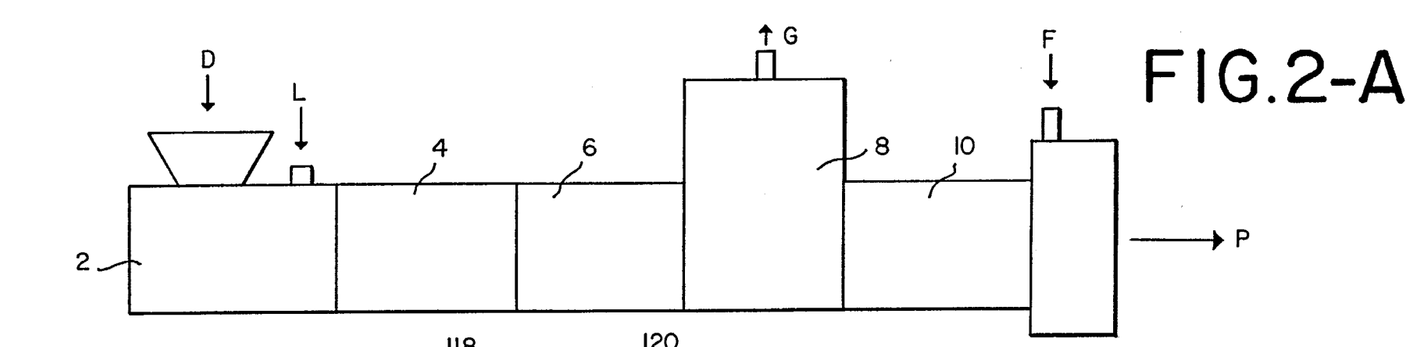
FIG. 2A is a schematic diagram of the extrusion apparatus suitable for preparing a product in accordance with the present invention.
FIG. 2B is a perspective view of a conventional extrusion apparatus that can be used in accordance with the embodiments of the present invention.

FIG. 2A shows a schematic representation of a typical extrusion apparatus showing that it is formed of several compartments, 2, 4, 6, 8, 10 and 12.

The dry powder blend can be introduced into hopper D and the water can be introduced into inlet L. The amount of water used in the process is adjusted so that a substantially dry product is produced. A person skilled in the art will be readily able to determine the control over the quantity of water that will be necessary to insure the characteristics of the final product. If necessary, several initial experimental runs can be conducted for this purpose. The flavor can be introduced into inlet F and the product P is obtained at the end of the line.

FIG. 2B is a perspective view of an extrusion system showing more detail of a typical conventional extrusion apparatus. In such a device, the driving means for the extrusion apparatus is any conventional motor drive 100 connected up to the extruder line which is formed of a number of compartments 102, 104, 106, 108, 110, and 112. The dry powder blend is introduced in hopper 118, water from holding tank 120 is introduced and is controlled through line 122 by valve 124 and enters the chamber 102 through line 126. The screws of the extrusion apparatus shown at 114 and 116 in chamber 104 can be adjusted in each compartment to provide the desired degree of extrusion force and function. The extrusion apparatus is typically supported by yoke 130. Flavor can be introduced from container 132 via lines 134 and 138 into the chamber 112. The product proceeds through die block 154 and through die orifice 157 for producing the desired product R in the form of strands. The extruded product is cut by a movable knife 166 mounted in support 168 as it comes out of discharge conduit 139. The knife engages with cutting base 170. The extruded product E is shown moving on belt 140. The die can be formed in any suitable shape or configuration so that the extrudate product E can be in any desired form as is well known in the art.

Figure 3:
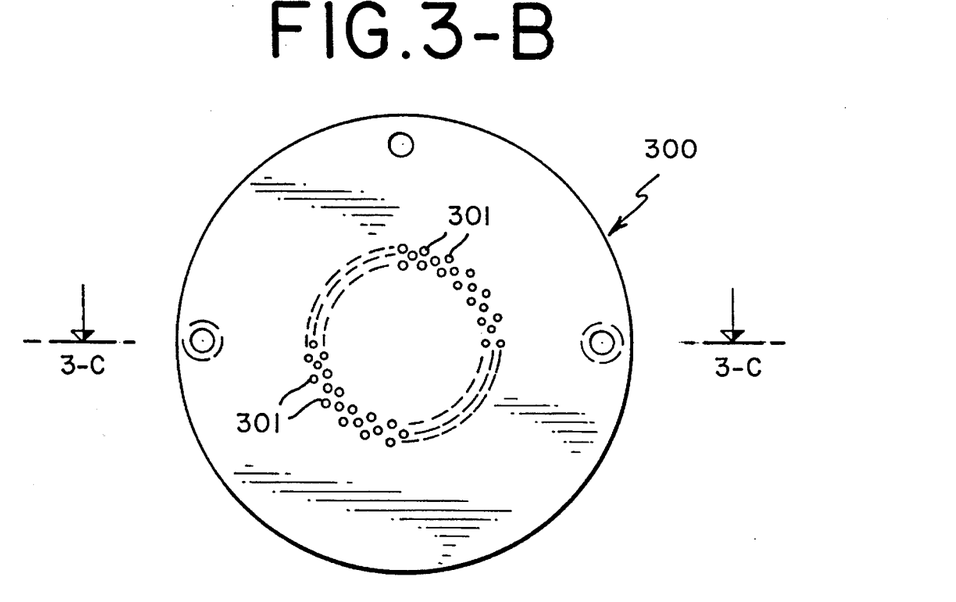
FIG. 3A is an elevational view of the downstream side of a die plate that can be used to extrude the food pellets in accordance with the present invention.
FIG. 3B is an elevational view of the upstream side of a die plate shown in FIG. 3A.
FIG. 3C is a sectional view along the section lines 3C of the die plate shown in FIG. 3B.

FIG. 3A and 3B show the downstream and upstream view, respectively, of the extruding die orifice 300. The dye 300 is attached to the extrusion apparatus through bolt holes 303. The openings in the die 301 can be of any desired shape or configuration according to the desired result.

The die plate can have a series of openings 301 in a circular pattern in a depressed area 302 formed by tapering sides 304, 305, as is typical in conventional die plate apparatus for food extrusion dies.

Figure 4:
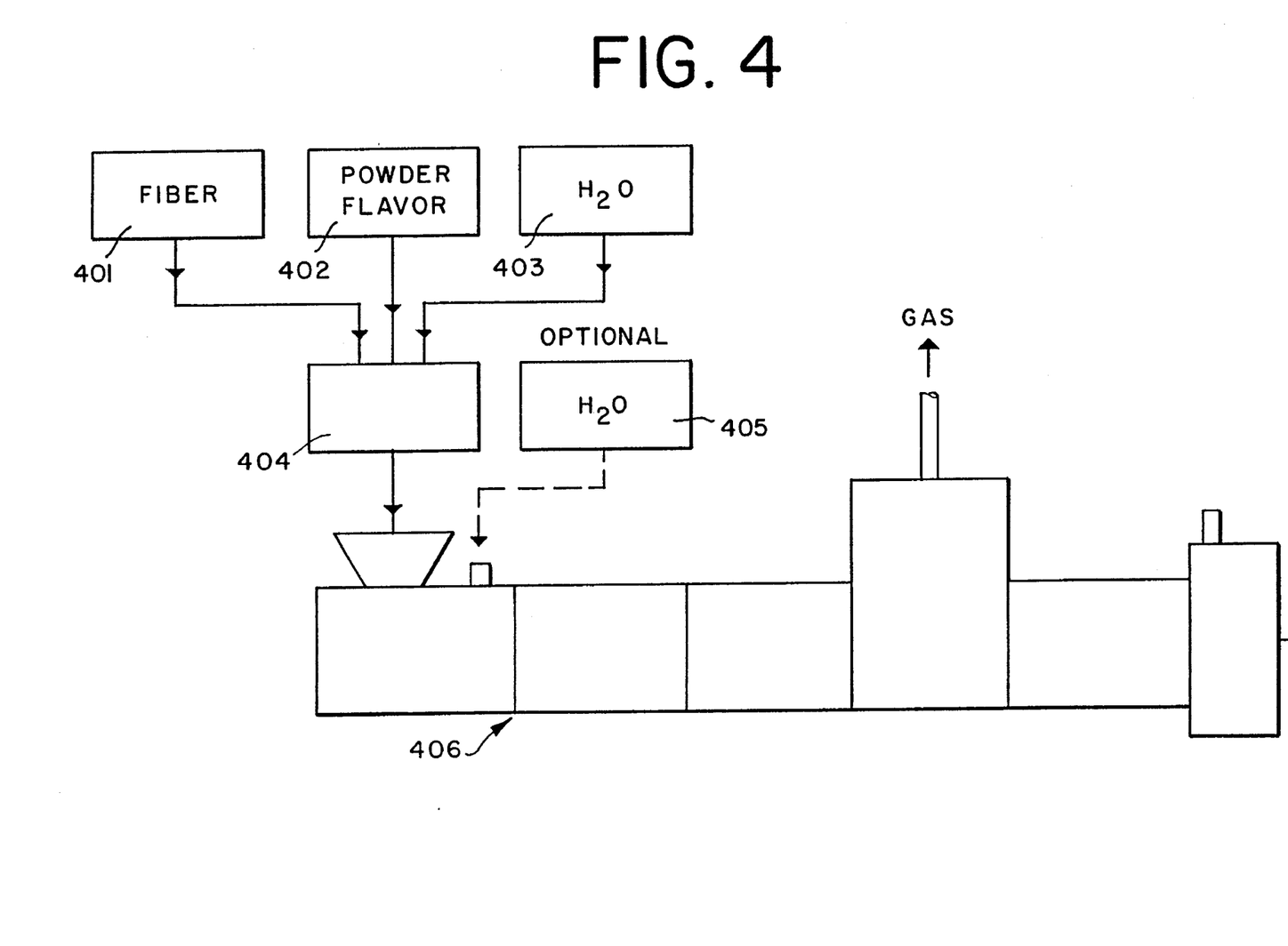
FIG. 4 is a schematic flow diagram showing one embodiment of the process of present invention.

There are a number of different process variations which can be followed to produce the edible flavor fiber product of the present invention. FIG. 4 through 7 contain illustrations of flow diagrams for a number of process variations of the invention. Thus FIG. 4 shows one embodiment where fiber, flavor and the water or other suitable liquid are in containers 401, 402, 403, respectively, and are introduced through separate lines into the blending apparatus 404. The resulting blend is then conveyed to the extruding apparatus 406 for production of the desired shaped product. Optionally the water can be introduced at location 405 directly into the extruder after the other ingredients are conveyed to the extruder. Gas is vented out as necessary and product P is recovered at the end of the line.

Figure 5:
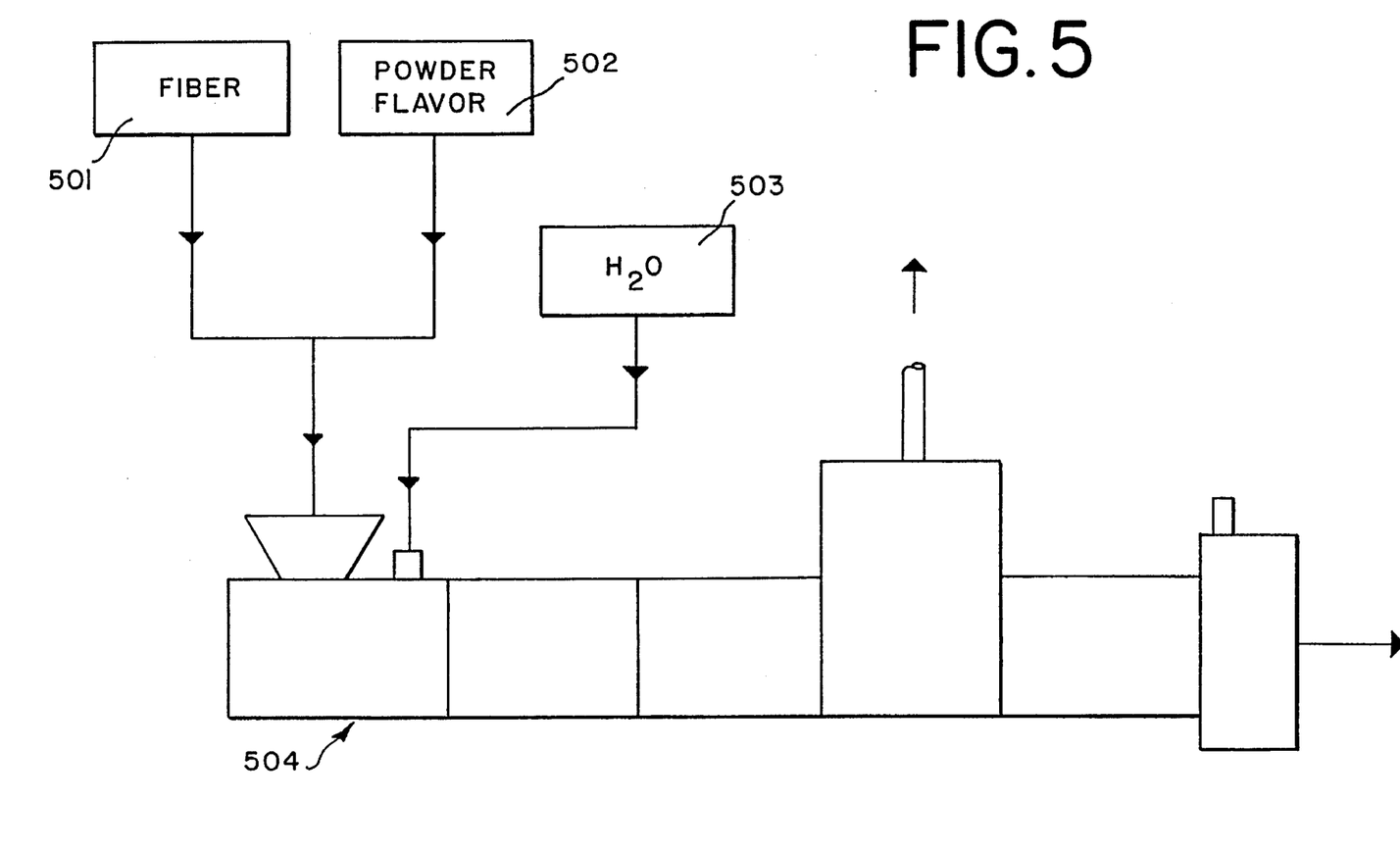
FIG. 5 is a schematic flow diagram showing another embodiment of the process in accordance with the present invention.

In another embodiment shown in FIG. 5, the fiber 501 and flavor 502 located in their respective holding tanks are introduced directly into the extruder 504 and downstream therefrom the water is introduced at location 503. Gas G is vented and the product P is recovered after completion of the extrusion operation.

Figure 6:
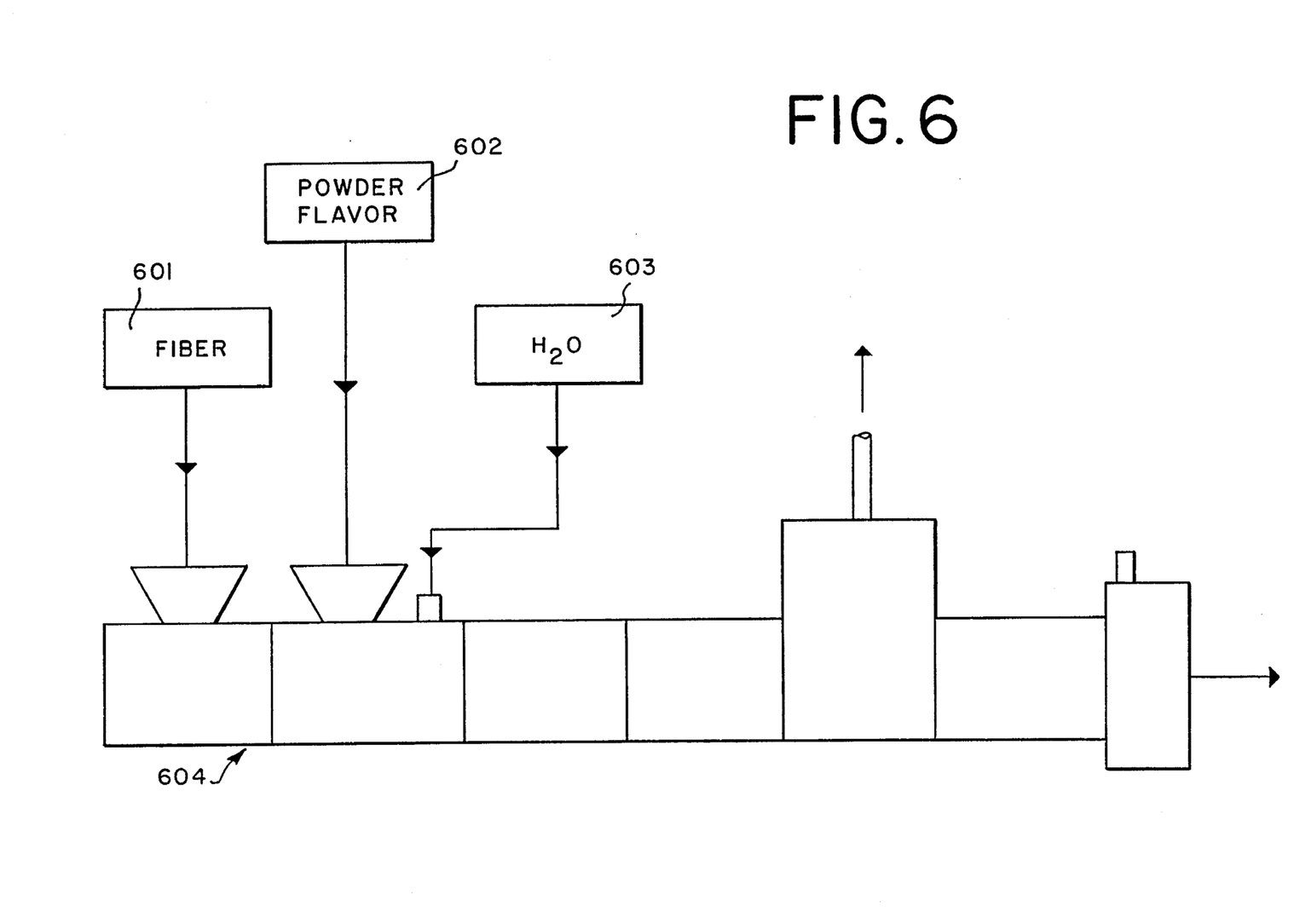
FIG. 6 is a schematic flow diagram of another embodiment of the present invention.

In a still further embodiment, each of the major ingredients fiber 601, flavor powder 602, and water 603 can be introduced into the extruder 604 at separate locations shown in FIG. 6. Venting of gas G and recovery of product P follow in the usual way.

Figure 7:
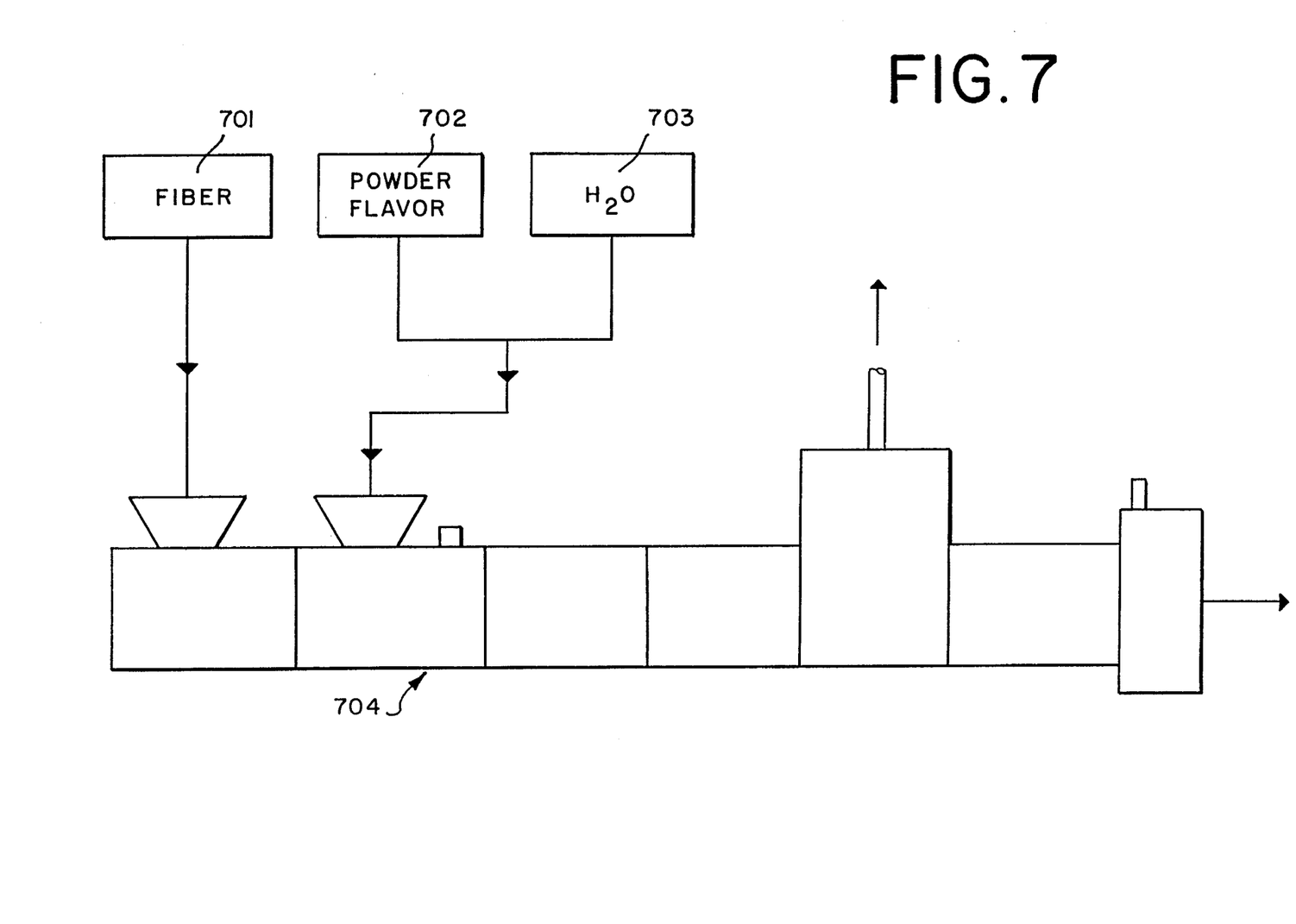
FIG. 7 is a schematic flow diagram of another embodiment of the present invention.

If desired the fiber can be introduced separately as shown in FIG. 7 at location 701 into extruder 704. The fibers 702 and water 703 are blended together in a conduit and then introduced downstream from the introduction of the fiber. The gas G and the product P exit from their respective outlets.

Figure 8:
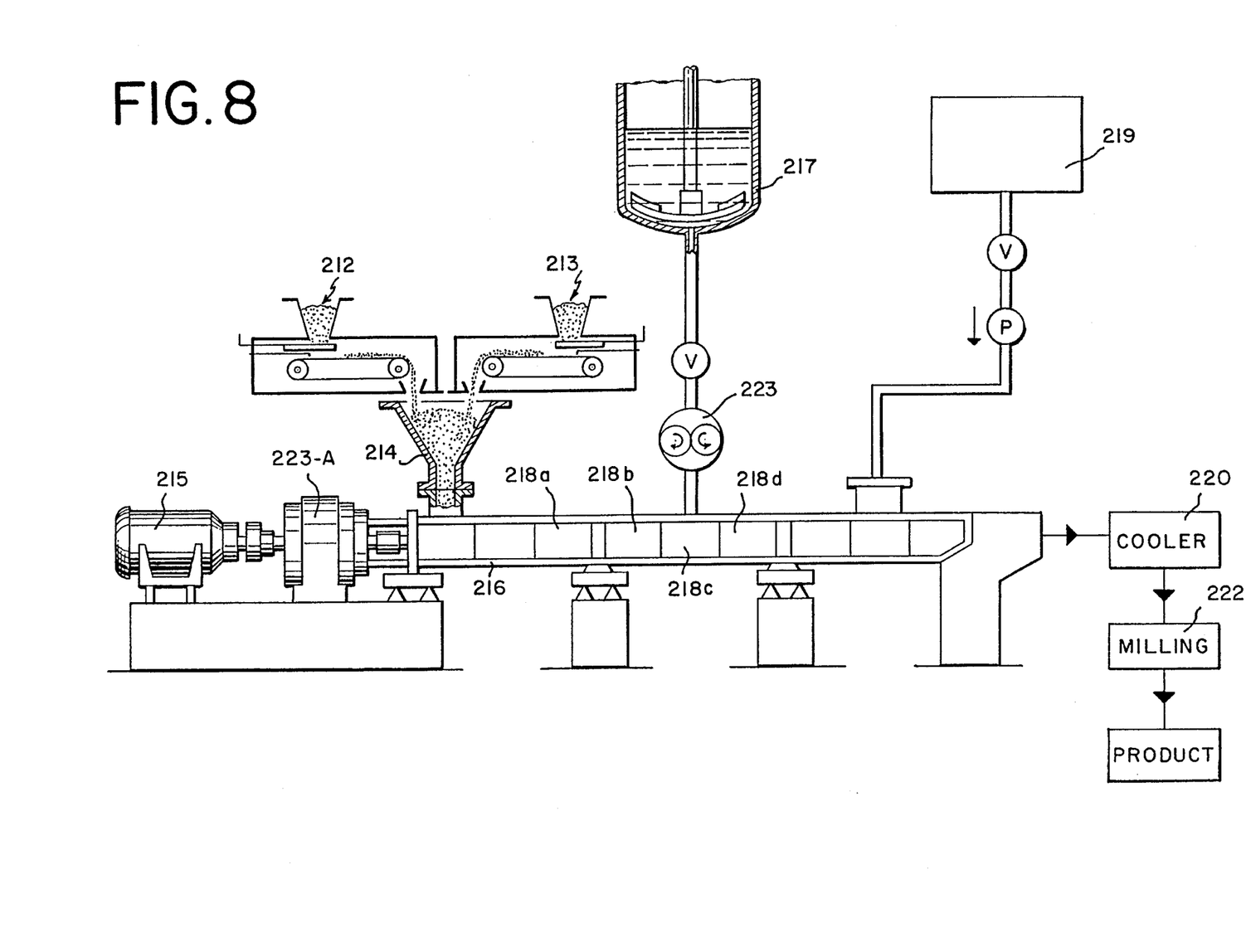
FIG. 8 is a elevational view of the apparatus that can be used to form the extruded food flavor product in accordance with the present invention.

FIG. 8 shows another embodiment of an overall apparatus which is an assembly of a variety of different components, including extrusion equipment. Motor 215 is connected to and drives the extruder screws located at 223a in barrel 216. The apparatus itself has a number of compartments 218a, 218b, 218c and 218d as is typical in a multi-compartment extrusion apparatus. This enables variation and individual control of the compartments to achieve the desired extrusion effect. Hopper 214 serves as the receiver for fiber 212 and binder 213 components. Mixture of components such as fiber plus binder, additive plus fiber etc. can be introduced into the system in this way. The liquid is contained in container 217 and is introduced into the system by means of valve 223 into chamber 218c. It should be understood that the location of the hopper 214 and the liquid inlet 217 can be at any convenient location depending on the other factors effecting the operation of the extrusion equipment. Flavor components can be added at location 219 through the tank provided therefor which can be fitted with a valve V and a pump apparatus P. Extruded product can be cut from the die face at the extruder and conveyed directly to pelletizer 221 from which the pellets go to cooler 220 and then from there to milling apparatus 222 and then to the final product receiver.

Figure 9:
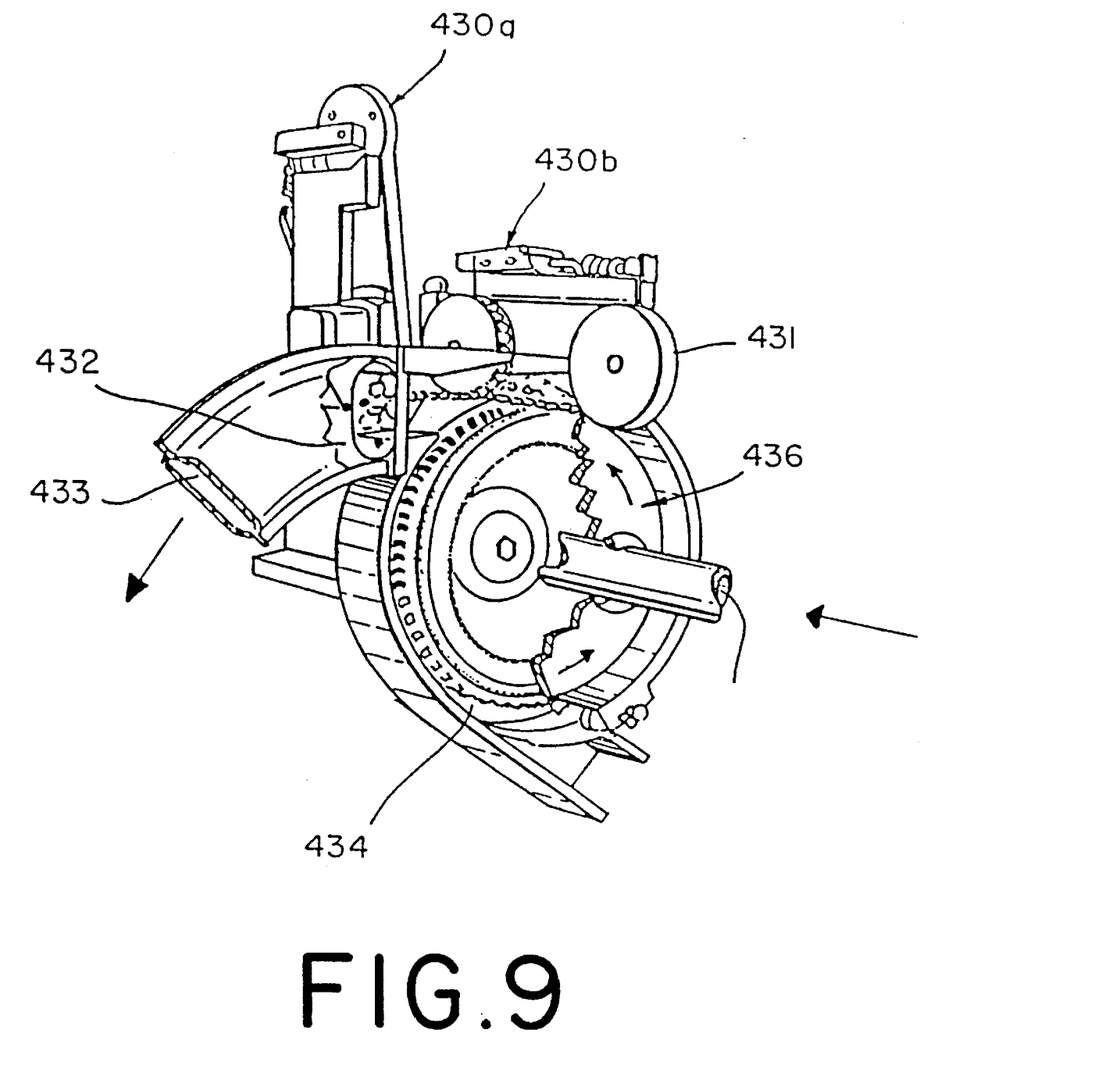

A suitable milling apparatus is shown in FIG. 9 in a detailed cutaway perspective view. The extruded material comes from the extruder at a pressure of 50–1000 psig. The exiting extrudate which contains the flavor material is fed into the pelletizer at zero pressure at location 435. The pelletizer is operated using a spinning extrusion dye 436 and functions by means of a rotating wheel 434. Moving pellet knife 431 and dual knife units 430a and 430b cause pellets to be formed at 432. The resulting pellets exit from the pelletizer at 433.

In one aspect of the invention, the process enables the conversion of adsorbed or powder flavors into solid granular form. The flavor granules when in contact with liquids such as water adsorb the liquid and readily disintegrate and thereby release the flavor. The process of the invention is characterized (1) by a low temperature extrusion forming step to avoid adversely affecting the flavor and (2) utilizing an extrusion step in combination with a granulating/milling step. As an example, the process of the present invention enables the production of a fine chocolate powder flavor in finely divided, free-flowing granular form. The granules are large enough to remain in a perforated or mesh holder similar to a tea bag but disintegrate quickly in hot water for hot beverage application.

In a preferred embodiment, the edible flavor fiber product of the present invention is formed of a composition of granules which contain chocolate flavor, a special oat fiber and suitable binder, such as maltodextrin. The oat fiber provides a high water absorption capacity and possesses a porous internal structure which allows increased water penetration from the granules. When milling is carried out following the extrusion, the surface area per unit weight of the granules is marketedly increased. This increased surface area further enhances the adsorption and dissolution of the granules when they are contacted with water. Hence, in accordance with the present invention a preferred embodiment of the invention includes the milling of the extrudate.

It is therefore one of the objects of the invention to develop a processing method to produce a relatively large particle of flavor, such as chocolate, that would be capable of being packed in a suitable package such as a mesh bag similar to a tea bag and readily dissolve in hot water. The chocolate flavor powder is compounded with binders and extrusion is used as a forming and agglomeration technique.

The throughput rate for our extrusion and agglomeration process is a function of the dimensions of the extruder. A typical rate, for example, is 50 pounds per hour for a pilot scale extruder. A detailed example of the extrusion/agglomeration system for producing a product in accordance with the invention is described as follows:

A dry mix consisting of 80 percent by weight of chocolate powder flavor, 15 percent by weight of oat fiber (Opta 770) and 5 percent by weight of maltodextrin (10 D.E.) was blended in a ribbon blender and then fed into a twin screw extruder by Ke-Tron twin screw feeder. The water was fed to the extruder in an amount of 7 percent by weight of the above dry ingredients.

Typically, the amount of water charged to the system used in making the edible, fiber containing flavor product of the present invention is small so that the resulting final product is a free-flowing granular product that is dry to the touch; that is, it has a dry feel. This is what is meant by the term "substantially dry" as used herein. In terms of numerical values of moisture content, typical amounts range from about 5 to about 15 percent, especially 5 to 10 percent moisture by weight of the product.

A pilot plant co-rotating twin screw extruder, Werner & Pfleiderer ZSK-30 was used for the production test. The extruder set up in processing conditions were as follows;

screw configuration: EC-4(IFF screw profile)

Ke-Tron Feeder: P1 Twin Screw

Extruder Die: Multiholes die plate, 60 holes with 1.2 mm diameter hole.

The barrel temperature for each of the five zones of the extruder was maintained using cooling water and electric heating as follows:

| Zone No.    | T1 | T2 | T3 | T4 | T5 |
|-------------|----|----|----|----|----|
| Temp. (°C.) | 25 | 25 | 60 | 80 | 80 |

The extrudate exit temperature was about 85° C. The throughput rate of the extruded product was about 50 lbs./hr.

The product at the exit of the extruder was clusters of very small particles with the clusters about 1 inch in length. The extrudate was collected in a tray for cooling by air. The extrudate was slightly soft and became hard upon cooling. The cluster extrudate was then broken apart with a Fitz Mill, model D-6, using screen number 2A and within a knife forward at slow speed. The finished product was obtained with the following product characteristics.

Particle size: greater than 90% through U.S. screen number 10 and on number 30. 5% through screen number 30 3–5% on screen number 10.

Moisture content: 10 percent

Water activity (Aw): 0.60

Density: 0.66 gram per cc (42 lb./ft$^3$)

Color: brown to dark

Solubility: dissolve in boiling water within 1 minute with stirring.

The extrusion agglomeration process is unique and efficient with no flavor loss or degradation since the processing temperature was not more than 85° C. Production yield rate is greater than 95%.

The extruder that can be used for the purposes of the present invention can be any suitable commercial extruder. Typically, the screws are made up of individual kneading blocks and conveying screw elements that are assembled on the shafts to create the precise shear and mixing action required for a given material. The barrel is assembled from individual units that are held together by tie rods. Different types of barrel sections are available to allow for multiple feeding, venting and injection of liquids. As a result, all of the processing variables can be adjusted and fine tuned to obtain precise conveying, plasticizing, mixing, shear and pressure conditions as will be apparent to a person skilled in the art. The standard materials used for both screw segments and barrel segments is nitrided steel. For special process requirements, various stainless steels and special alloys can be used and persons familiar with the food technology will know what type of materials will be suitable. The extruder has two co-rotating intermeshing screws with a self cleaning profile. The screw profile is designed so that the tip of one screw wipes the flank and root of the other screws resulting in self cleaning action. This type of twin screw mechanism provides efficient conveying, pressure build up and self cleaning capabilities.

The barrel cooling system permits control of temperature and has a number of valves, return lines and check valves to regulate flow and temperature in each zone. The temperature is monitored by thermocouples in the barrel sections and controlled by the temperature controllers and the electrical panel. An example of a suitable extruder is the ZSK-30 by Werner & Pfleiderer.

Examples of fiber that can be added to the system of the present invention to produce the granular flavor fiber edible product include powdered cellulose which is a 99% dietary fiber that is bland, odorless and ultra white. This is a noncaloric function bulking agent that absorbs moisture and other liquids many times it weight and thus is useful in a wide range of uses including low fat and low calorie formulations.

| Typical Properties: | |
|---|---|
| Color | White |
| Odor | None |
| Flavor | Bland |
| Dietary Fiber Content (% NDF) | NLT 99% |
| Ash (%) | NMT 0.3% |
| Ph (10% suspension) | 5.0–6.5 |
| Heavy Metals (ppm as PB) | NMT 10 |
| Average Fiber Length | 20 microns |
| Moisture | 5%–7% |
| Bulk | 130–150 cc/50 gr. |
| Water Absorption Capacity | NA |
| Density | 20 lbs/cu. ft. |
| Sieve Analysis | |
| On          40 mesh | 0% |
| Thru       100 mesh | 99% |
| Thru       200 mesh | 90%–95% |
| Thru       300 mesh | 85%–90% |
| Thru       400 mesh | 80%–85% |

Such a product is available from Ven den Bergh Foods Company.

Another suitable type of powdered cellulose for the food industry is Solka-Floc of James River Corporation. This proprietary product is manufactured by a dry, mechanical process and is reportedly composed of approximately 90% beta-1,4-glucan and 10% hemi-celluloses such as xylan, araban, mannan and galactan.

Powdered cellulose is purified from specialty treated wood pulp as is known art from which the lignins and impurities have been removed. The particle size of the fibers is reduced by ball milling, cutting or other means and the particle size range can be from 20 microns to 300 microns average fiber length so that the product can be used in a variety of applications. Bulk furnished by the products and the ability to absorb water are greater with the larger particle sizes. It has been found for purposes of the present invention that products with a water absorption of 50 to 900 are particularly good (gm per gm fiber).

Oat fiber is the preferred fiber for purpose of this invention. Produced by Opta Food Ingredients Inc. the product known as Opta Oat Fibers 770 which is very high in total dietary fiber, essentially calorie and fat free and has a high water and oil holding capacity is especially well suited for purposes described herein. It is stable over a wide range of pH and temperature ranges and is bland in flavor and light tan in color.

Typical nutritional data for the preferred oat fiber product used in this invention is set forth below:

| % TDF as is | 94.0 |
| % fat | 0.1 |
| % protein | 0.4 |
| % moisture | 4.0 |
| % ash | 1.2 |
| % available carbohydrates | 0.3 |
| sodium ppm | 199 |
| calcium ppm | 300 |
| vitamins | nil |
| calorie/gram | 0.04 |

The following examples are illustrative of flavors that can be made and incorporated into the flavor fiber edible product of the present invention:

A chocolate flavor powder K3562168 is composed of the following:

| Cocoa powder | 61.5% |
| Cream powder (72% fat) | 5% |
| Non fat dry milk | 5% |
| Maltodextrin binder | 13.5% |
| Dark chocolate | 1.5% |

The above chocolate flavor was then used to prepare a flavor-fiber product suitable for a hot instant beverage:

| RUNS: | 1 | 2 | 3 | 4 | 5 |
| --- | --- | --- | --- | --- | --- |
| Chocolate flavor K3562168 | 100 | 80 | 80 | 80 | 80 |
| Maltodextrin 10 D.E. | — | 15 | 10 | 5 | 5 |
| Oat fiber | — | 5 | 10 | 15 | 14 |
| NaHCO$_3$ (Sodium Bicarbonate) | — | — | — | — | 1 |

The advantage of the use of the NaHCO$_3$ or other salt of bicarbonate (e.g. KHCO$_3$) in the formula is to enhance the rate of rehydration of the granules. In place of bicarbonates, carbonates which yield CO$_2$ during the hydration of the granules such as Na$_2$CO$_3$ are useful.

The sample was evaluated with 50 gm of hot water containing 0.5 grams of extrudate. Sample 1 dissolved slowly and after 5 minutes was somewhat sticky. Samples 4 and 5 dissolved very quickly.

As will be apparent, the foregoing formula can be changed by incorporating other materials and a variety of flavors. For example, an orange flavor formulation can be prepared as follows:

Orange Flavor Formulation

An orange flavor formulation is prepared by admixing:

| Ingredients | Parts |
| --- | --- |
| Natural orange oil | 13.00 |
| Acetaldehyde | 1.50 |
| Ethyl acetate | 0.10 |
| Ethyl butyrate | 0.50 |
| Propanol | 0.10 |
| trans-2-Hexenal | 0.10 |
| Ethyl Alcohol (95%) | 60.00 |
| Fusel Oil | 0.05 |
| Propylene Glycol | 24.65 |

This is denominated Flavor "A". A second formulation, Flavor "B", is prepared by adding 2-ethylidene cis-3-hexenal (1 percent in ethanol) to a portion of Flavor "A" in the ratio of 2 parts to 100 parts of Flavor "A".

Each of Flavors "A" and "B" is added to the amount of 2 ounces per gallon of 32° Baume sugar syrup to produce a syrup for combination with water to form a drink. The beverage prepared using Flavor "A" is a passable orange beverage of good character, flavor and intensity.

The beverage prepared using Flavor "B" has a much improved flavor. The improvement contributed by ethylidenehexenal is due to:

1. a greater degree of the natural character of freshly squeezed orange juice
2. an increase in the pulp like notes
3. greater orange juice flavor depth Another suitable flavor is strawberry having the following formulation:

| Ingredient | Parts by Weight |
| --- | --- |
| Parahydroxy benzyl acetone | 0.2 |
| Vanillin | 1.5 |
| Maltol | 2.0 |
| Ethyl-3-methyl-3-phenyl glycidate | 1.5 |
| Benzyl acetate | 2.0 |
| Ethyl butyrate | 1.0 |
| Methyl cinnamate | 0.5 |
| Methyl anthranilate | 0.5 |
| Alpha-ionone | 0.1 |
| Gamma undecalactone | 0.2 |
| Diacetyl | 0.2 |
| Anethole | 0.1 |
| Cis-3-hexenol | 1.7 |
| 95% aqueous ethanol | 38.5 |
| Propylene glycol | 50.0 |
| | 100.0 |

A cherry flavor formulation, lemon formulation and lime formulation can also be used:

Cherry Flavor Formulation

The following mixture is prepared:

| Ingredient | Parts by Weight |
| --- | --- |
| Eugenol | 1.75 |
| Cinnamic Aldehyde | 4.50 |
| Anisyl Acetate | 6.25 |
| Anisic Aldehyde | 9.25 |

-continued

| Ingredient | Parts by Weight |
|---|---|
| Ethyl Oenanthate | 12.50 |
| Benzyl Acetate | 15.50 |
| Vanillin | 25.00 |
| Ethyl Methyl Phenyl Glycidate | 25.00 |
| Ethyl Butyrate | 37.25 |
| Amy Butyrate | 50.00 |
| Tolyl Aldehyde | 125.00 |
| Benzaldehyde | 558.00 |
| Alcohol 95% | 130.00 |

Lemon Flavor Formulation

| Ingredient | Parts by Weight |
|---|---|
| Methyl Heptenone | 0.50 |
| Terpineol | 1.00 |
| Linallol | 1.00 |
| n-Decanal | 1.25 |
| n-Octanal | 1.25 |
| Geranyl Acetate | 1.75 |
| Citral | 60.00 |
| Oil of lemon, cold pressed | 100.00 |
| Orange terpenes | 833.25 |

Lime Flavor Formulation

The following mixture is prepared:

| Ingredient | Parts by Weight |
|---|---|
| Cymene | 1.0 lb. |
| Dipentene | 1.0 lb. |
| Oil of Lime Distilled | 3.0 lb. |
| 6.0 oz. av. citral Terpineol | 2.0 lb. |
| Lemon Terpenes | 10.0 lb. |
| 10 oz av. Lime Terpenes | 82.0 lb. |

One of the important ingredients in the flavor fiber edible product of the present invention is maltodextrin which is a bland, food grade, white carbohydrate with very desirable bulking and bodying characteristics. It functions as the binder. It has low sweetness, is readily soluble.

| Chemical and Physical Data | |
|---|---|
| Dextrose Equivalent | 9.0–12.0 |
| Moisture, % Max. | 6.0 |
| pH, 20% Solution | 4.0–4.7 |
| Form | White Powder |
| Typical Carbohydrate Profile (dry basis) | |
| Monosaccharides | 1% |
| Disaccharides | 4% |
| Trisaccharides | 6% |
| Tetrasaccharides | 5% |
| Pentasaccharides, & Above | 84% |

The following are additional examples of some other flavors that are applicable by extrusion agglomeration process of the present invention.

| | % weight |
|---|---|
| 1. Apple Flavor | |
| Natural Apple Flavor, (spray dried) | 46.8 |
| Maltodextrin, 10 D.E. | 44.6 |
| Oat Fiber | 8.6 |
| 2. Lemon Flavor | |
| Natural Lemon Flavor, (spray dried) | 52.4 |
| Maltodextrin, 10. D.E. | 36.7 |
| Oat Fiber | 11.9 |
| 3. Orange Flavor | |
| Natural orange Flavor, (spray dried) | 43.8 |
| Maltodextrin, 10 D.E. | 35.7 |
| Fine Sugar | 8.0 |
| Oat Fiber | 13.5 |
| 4. Peanut Flavor | |
| Natural Peanut Flavor (spray dried) | 40.0 |
| Maltodextrin, 10 D.E. | 35.5 |
| Sodium Caseinate | 8.0 |
| Sugar | 5.0 |
| Solka Floc | 11.5 |

Further variations and modifications of the foregoing will become apparent to those skilled in the art and are intended to be encompassed by the claims appended hereto.

We claim:

1. The process for preparing a substantially dry, readily dispersible, granular flavor-fiber edible product for use in making an instant beverage consisting of:

(i) admixing a powdered flavor material with oat fiber and maltodextrin to form a blended powder-fiber mixture;

(ii) adding the powder-fiber mixture to an extruder;

(iii) adding sufficient water to said extruder simultaneously with the addition of the powder-fiber mixture to thereby form an extrudable mixture; and, (iv) extruding said extrudable mixture at no greater than 85° C. to form a substantially dry product, in the form of strands, cutting the strands with a knife, (v) and thereafter milling said product to increase the surface area per unit weight of said granular product and to produce a free-flowing granular product that is dry to the touch, whereby said product has a particle size greater than 90% through U.S. screen number 10 and on number 30, 5% through U.S. screen number 30 and 3–5% on screen number 10.

2. The process according to claim 1 wherein said oat fiber has the following properties:

| % TDF as is | 94.0 |
|---|---|
| % fat | 0.1 |
| % protein | 0.4 |
| % moisture | 4.0 |
| % ash | 1.2 |
| % available carbohydrates | 0.3 |
| sodium ppm | 199 |
| calcium ppm | 300 |
| vitamins | nil |
| calorie/gram | 0.04 |

\* \* \* \* \*